United States Patent
Negrillo et al.

(10) Patent No.: US 9,552,144 B2
(45) Date of Patent: Jan. 24, 2017

(54) ITEM PREVIEW WITH AGGREGATION TO A LIST

(75) Inventors: Belmer Perella Garcia Negrillo, San Francisco, CA (US); Michael Ari Katz, Mountain View, CA (US); Roel Ramirez, Hayward, CA (US)

(73) Assignee: PAYPAL, INC., San Jose, CA (US)

( * ) Notice: Subject to any disclaimer, the term of this patent is extended or adjusted under 35 U.S.C. 154(b) by 442 days.

(21) Appl. No.: 12/972,351

(22) Filed: Dec. 17, 2010

(65) Prior Publication Data

US 2012/0159379 A1    Jun. 21, 2012

(51) Int. Cl.
G06Q 30/06     (2012.01)
G06F 3/0484    (2013.01)
G06F 3/0481    (2013.01)
G06F 17/30     (2006.01)

(52) U.S. Cl.
CPC ......... *G06F 3/04842* (2013.01); *G06F 3/0481* (2013.01); *G06F 17/30554* (2013.01); *G06Q 30/0629* (2013.01); *G06Q 30/0643* (2013.01)

(58) Field of Classification Search
CPC .............. G06F 3/0481; G06F 17/30554; G06F 17/30867; G06F 3/04842; G06F 3/048; 3/G06Q 30/02; G06Q 30/04; G06Q 30/06; 30/G06Q 0234; G06Q 0283; G06Q 30/0601; G06Q 0621; G06Q 30/0625; G06Q 0629; G06Q 30/0633; G06Q 0641; G06Q 0643; G06Q 30/0603
USPC   715/781, 708, 738, 745, 760, 810; 707/768, 26.62, E17.014; 705/14.34, 26.1, 705/27.1
See application file for complete search history.

(56) References Cited

U.S. PATENT DOCUMENTS

| | | | | |
|---|---|---|---|---|
| 5,986,670 A | * | 11/1999 | Dries et al. | 345/629 |
| 7,975,020 B1 | * | 7/2011 | Green et al. | 709/217 |
| 2002/0026386 A1 | * | 2/2002 | Walden | G06Q 30/02 705/14.39 |
| 2006/0048070 A1 | * | 3/2006 | Taylor et al. | 715/773 |
| 2006/0212362 A1 | * | 9/2006 | Donsbach et al. | 705/26 |
| 2008/0071631 A1 | * | 3/2008 | Nagarajayya | G06Q 30/02 705/26.3 |
| 2008/0113674 A1 | * | 5/2008 | Baig | 455/456.3 |
| 2009/0043674 A1 | * | 2/2009 | Minsky et al. | 705/27 |
| 2009/0063299 A1 | * | 3/2009 | Amacker | 705/27 |
| 2009/0150262 A1 | * | 6/2009 | Mizhen | 705/27 |

(Continued)

OTHER PUBLICATIONS

Google Testing Significant Redesign: Full-Page Search Preview Pop-Overs (published on Oct. 5, 2010) http://www.fastcompany.com/1693369/google-testing-significant-redesign-full-page-search-preview-pop-overs.*

*Primary Examiner* — Jeffrey A Gaffin
*Assistant Examiner* — Rinna Yi
(74) *Attorney, Agent, or Firm* — Maschoff Brennan

(57) ABSTRACT

A server machine manages and presents a user interface. The user interface presents search results, and the server machine receives a cursor input that corresponds to a particular search result. The particular search result references an item available for purchase, and the item is described by descriptors. Responsive to the cursor input, the user interface presents a preview window that contains a descriptor not shown in the particular search result. The server machine receives a further cursor input that indicates the item is to be included in a list of items. Responsive to the further cursor input, the user interface presents a list of items as including an icon that references the item. The icon indicates that the item is included in the list of items.

19 Claims, 12 Drawing Sheets

(56) References Cited

U.S. PATENT DOCUMENTS

2010/0191619 A1\* 7/2010 Dicker et al. .................. 705/27

\* cited by examiner

ITEM PREVIEW WITH AGGREGATION TO A LIST

TECHNICAL FIELD

The subject matter disclosed herein generally relates to data processing. Specifically, the present disclosure addresses systems and methods of presenting an item preview with aggregation to a list.

BACKGROUND

A machine may be configured to facilitate decision-making by a user. For example, a general-purpose computer may be configured by special-purpose software to become a special-purpose computer that functions as a search engine to search a database. A user of a client device may submit a query to the search engine. In response, the search engine may identify search results within the database based on the submitted query and present the search results to the client device for viewing by the user. One or more of the presented search results may identify an item (e.g., a product, a specimen of a product, service, or an instance of a service). Viewing the presented search results, the user may operate the client device to select a particular search result from among the presented search results.

Where the number of search results to be presented is large, the search engine may present the search results a portion at a time. For example, the search results may be subdivided into multiple pages and presented one page at a time. As another example, the search results may be presented on one single page that extends beyond a viewable screen area displayed by the client device. The client device may display only a portion of the search results at a given time, and the user may operate the client device to adjust (e.g., move or scroll) the viewable screen area in a manner that displays another portion of the search results.

BRIEF DESCRIPTION OF THE DRAWINGS

Some embodiments are illustrated by way of example and not limitation in the figures of the accompanying drawings in which.

DETAILED DESCRIPTION

Figure 1:
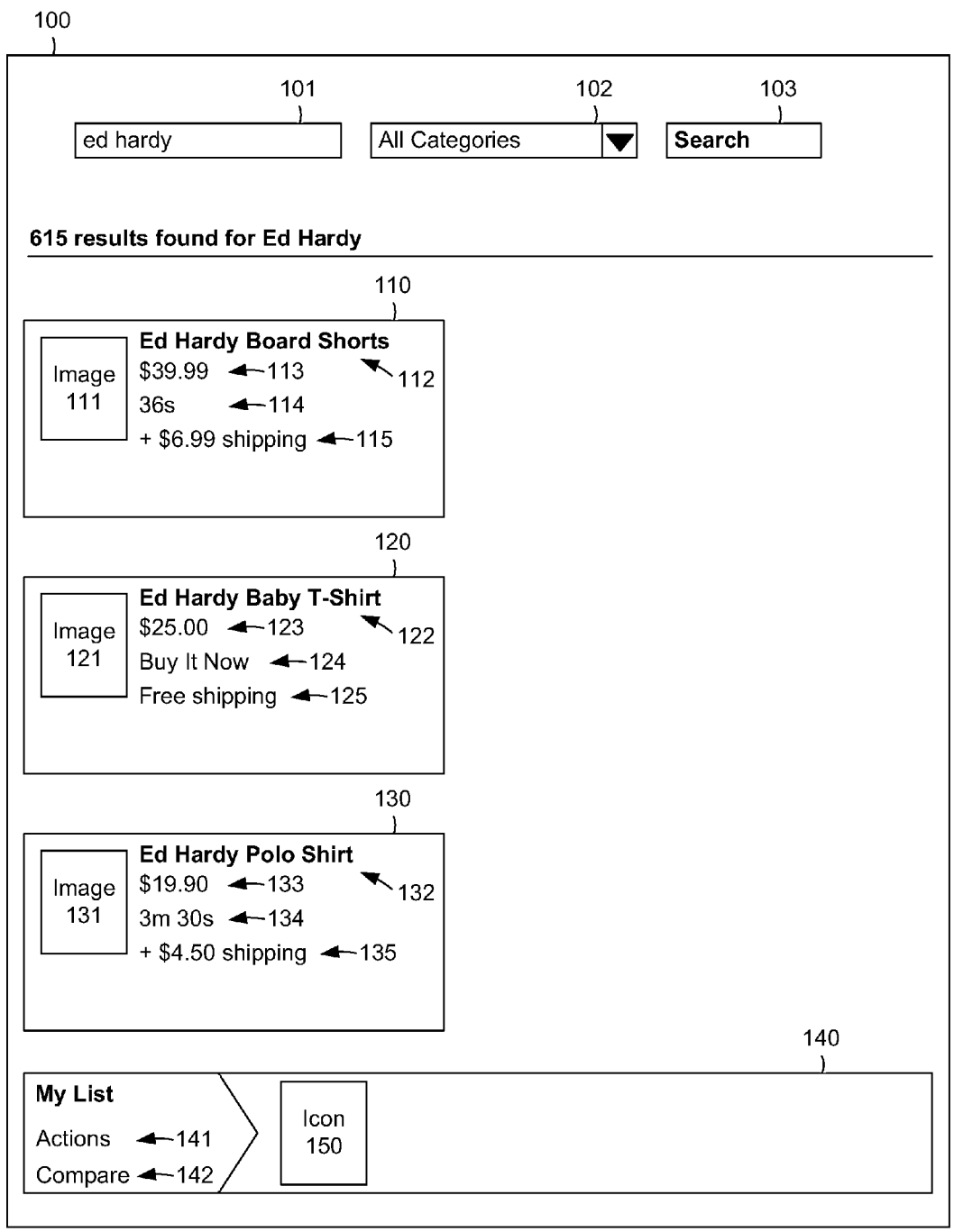
FIG. 1 is a diagram of a user interface showing search results, according to some example embodiments.

Example methods and systems are directed to presenting an item preview with aggregation to a list. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A user interface (e.g., a graphical user interface) is managed by a server machine to present search results through use of a client device of the user. The server machine may include modules configured (e.g., by software) to manage the user interface. The user interface may be all or part of the web page served by the server machine to the client device. A particular search result indicates an item that is described by descriptors. By managing the user interface, the server machine may present one descriptor (e.g., a first descriptor) in the particular search result, while another descriptor (e.g., a second descriptor) is absent from the particular search result.

A cursor input (e.g., a mouseover event or a mouse click event) is received by the server machine from the client device. The cursor input corresponds to the search result (e.g., to a specific area or link within the search result) and indicates that the item is selected for augmented (e.g., more detailed) presentation. In response to the cursor input, the server machine may present an augmented presentation of the item by presenting a graphical window that indicates (e.g., displays) the item. This graphical window contains a preview of the item selected for augmented presentation and hence may be termed an "item preview." Accordingly, the user interface indicates that the item is previewed. This may have the effect of presenting an item preview using the user interface.

As a preview window, the graphical window is displayable alongside the search results, without obscuring any of the search results (e.g., while maintaining an uninstructed presentation of the search results). The graphical window is presented within the user interface and includes the absent descriptor (e.g., the second descriptor), as well as the previously presented descriptor (e.g., the first descriptor).

Another cursor input (e.g., a mouse click event) is received by the server machine from the client device. This further cursor input corresponds to the graphical window (e.g., to an aggregation link within the graphical window)

and indicates that the item is selected as a member of a list of items (e.g., a shopping list or a watch list). In response to this further cursor input, the server machine presents an icon that indicates the item is included in the list of items. This icon may be termed an "aggregation icon" and is presented within the user interface. Accordingly, the user interface indicates that the item is aggregated into the list of items. This may have the effect of presenting, within the user interface, an aggregation of one or more items previously previewed.

The server machine may receive a request to store the list of items as corresponding to the user of the client device. The server machine may also receive a name of the list of items (e.g., to identify the list among multiple lists that correspond to the user). In response to this request, the server machine may store the list of items in a database. The user interface may indicate the list of items as successfully stored.

The server machine may receive a request to compare items in the list of items, and the request may include a selection of two or more items for comparison. In response to this request, the server machine may present another graphical window (e.g., a comparison window) that indicates the item and another item (e.g., one or more further items) are selected for comparison. The comparison may show descriptors for the selected items (e.g., presenting respective values of an attribute side-by-side), and these descriptors may be determined based on preferences of the user.

From the perspective of the user of the client device, the server machine may function as an item comparison machine that provides an integrated finding experience in which the user may compare items in multiple formats. These formats include comparing adjacent items indicated in adjacent search results, comparing an item indicated in a search result with an item indicated in an item preview, comparing aggregated items indicated in the list of items, or any suitable combination thereof. The user may choose from among these formats, perhaps repeatedly, within a single user user interface (e.g., without navigating away from the web page).

In one example of a user workflow, the user first searches for something by submitting a query using the user interface, and in response, the user interface presents search results returned from the query. The user may apply one or more search refinements to narrow the search results. The user then scans the search results, which are presented as a vertical list of search results, and finds a search result that indicates a candidate item for potential purchase. The user opens a preview pane for the candidate item and reads more details about the candidate item. With the preview pane still open, the user then scrolls the presented search results and compares the candidate item shown in the preview pane with other items indicated in the search results.

Continuing the above example, if the user likes one or more items, shown in the preview pane or in the search results, the user aggregates those one or more items to a list of items, which in this example is shown as a collection tray in the user interface. The collection tray is persistent with respect to the user, and the user may add items to the list of items at any time, including over multiple login sessions (e.g., spread over many days, weeks, or months). The user may expand a collection tray into a comparison window that presents information about the aggregated items in tabular form for convenient comparison. The user then compares items within the collection tray. The user may read about the features of the items, remove items, and further items, or any suitable combination thereof. The user in this example then chooses one of the items for actual purchase and initiates a purchase transaction for that item.

FIG. 1 is a diagram of a user interface 100 showing search results 110, 120, and 130, according to some example embodiments. As shown, a query field 101 contains the search phrase "ed hardy." A pull-down menu 102 indicates that "All Categories" within a database are subject to querying. A search execution button 103 is operable within the user interface 100 to execute a query using information from the query field 101 and the pull-down menu 102.

The search results 110, 120, and 130 may be obtained in any manner (e.g., generated by a search engine in response to a submitted query, retrieved from a database, or accessed in a memory). As shown, the search results 110, 120, and 130 are resultant from execution of a previous query that used information from the query field 101 and the pull-down menu 102.

The search result 110 is presented in the user interface 100 as including an item image 111, an item name 112 and descriptors 113-115. The item image 111 is a visual representation of an item referenced by the search result 110. In other words, the search result 110 references and indicates the item shown in the item image 111. In some example embodiments, the item is available for purchase from a network-based system (e.g., an online store, an auction website, or a classified ad server).

A descriptor of an item includes information that describes the item. In many cases, a descriptor may be a value of an attribute that is exhibited by the item. For example, if an item is colored red, a descriptor for that item may be "red," where the word "color" is an attribute of the item, and where the word "red" is the value of that attribute as exhibited by the item. A descriptor may include the attribute, but need not do so. As an example, an automobile with five seats may have "5 seats" as one of its descriptors, where "seats" is an attribute of the automobile, and where "5" is the value of that attribute as exhibited by the automobile. As a further example, a descriptor may be "color=red" or "color: red," where "color" is the attribute, and where "red" is the value of the attribute as exhibited by the item.

Within the search result 110, the descriptor 113 has a value of "$39.99" (shown) for an attribute of "price" (not shown). The descriptor 114 has a value of "36 s" (shown) for an attribute of "time remaining" (not shown). The descriptor 115 has a value of "$6.99" (shown) for an attribute of "shipping fee" (not shown).

As shown, the search result 120 includes an item image 121, an item name 122, and descriptors 123-125. The item image 121 is a visual representation of an item referenced by the search result 120, and this item may be available for purchase. In other words, the search result 120 references and indicates the item shown in the item image 121. The descriptor 123 has a value of "$25.00" for an attribute of "price." The descriptor 124 has a value of "Buy It Now" for an attribute of "time remaining" The descriptor 125 has a value of "free" for an attribute of "shipping fee." In some example embodiments, the search result 120 includes additional descriptors not present in the search result 110. In certain example embodiments, the search result 120 lacks one or more of the descriptors shown in the search result 110.

As shown, the search result 130 includes an item image 131, an item name 132, and descriptors 133-135. The item image 131 is a visual representation of an item referenced by the search result 130, and this item may be available for purchase. In other words, the search result 130 references and indicates the item that is shown in the item image 131. The descriptor 133 has a value of "$19.90" for an attribute of "price." The descriptor 134 has a value of "3 m 30 s" for an attribute of "time remaining." The descriptor 135 has a value of "$4.50" for an attribute of "shipping fee." In some example embodiments, the search result 130 includes additional descriptors not present in the search result 110, and the search result 120, or both. In certain example embodiments, the search result 130 lacks one or more of the descriptors shown in the search result 110, the search result 120, or both.

The user interface 100 also includes a list of items 140 titled "My List." As shown in FIG. 1, the list of items 140 includes icon 150. The icon 150 references an item (e.g., an item available for purchase) and indicates membership of this item in the list of items 140. Moreover, the icon 150 may be considered an aggregation icon indicating that this item is aggregated into the list of items 140.

The list of items 140 may be presented as a graphical window that displays one or more icons (e.g., icon 150), or each of the one or more icons represents an item included in the list of items 140. As presented in the user interface 100, the graphical window need not present every item that is included in the list of items 140. For example, the graphical window may display a set of icons that represent at least a portion of the list of items 140. Moreover, the graphical window showing the list of items 140 may obscure one or more search results (e.g., search result 130) or may maintain an unobstructed presentation of one or more search results within the user interface 100.

The list of items 140 also includes an action link 141 titled "Actions" and a comparison link 142 titled "Compare." Operation of the action link 141 and the comparison link 142 is discussed below with respect to FIG. 6-7.

Figure 2:
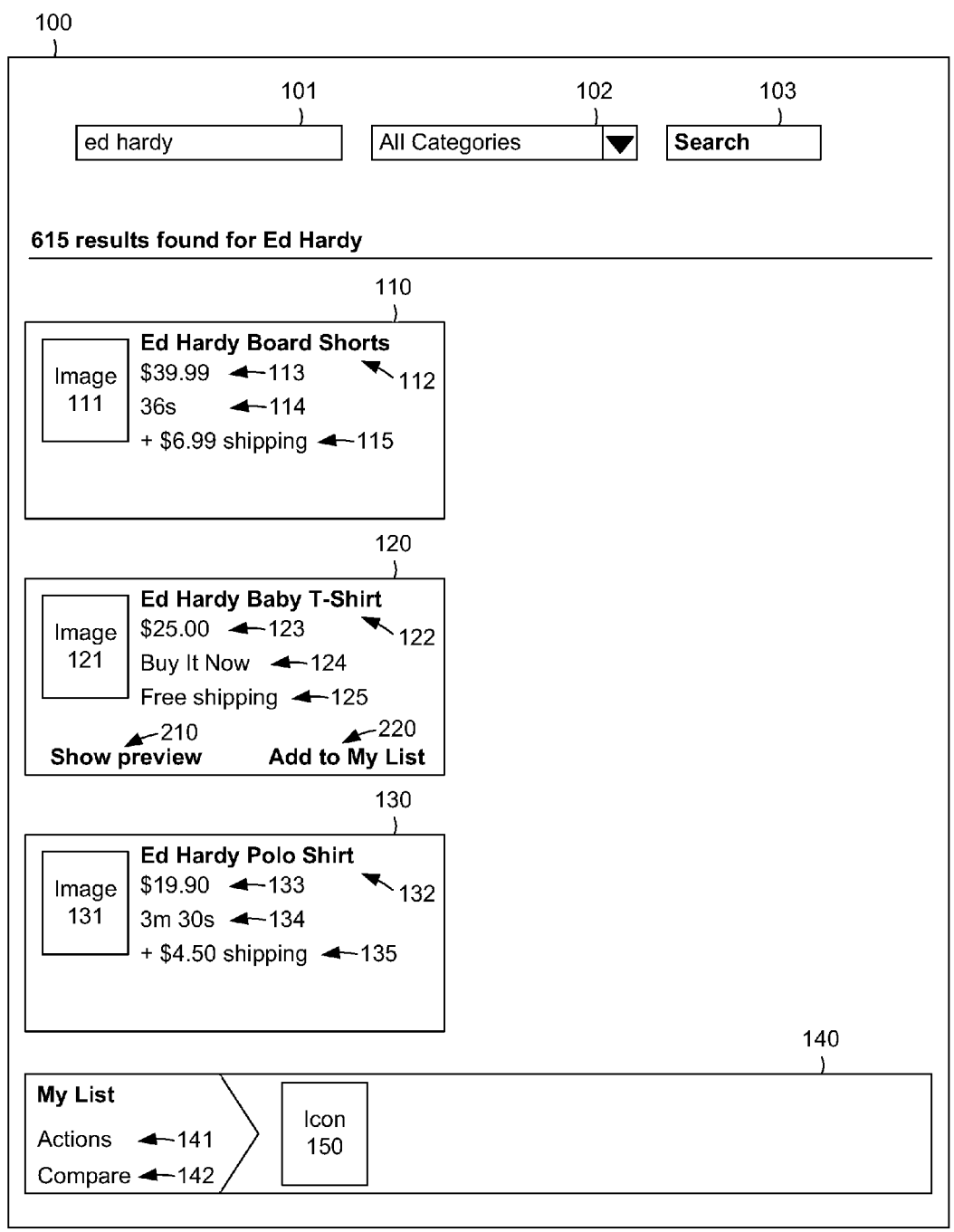
FIG. 2 is a diagram of the user interface showing a particular search result as including a preview link, according to some example embodiments.

FIG. 2 is a diagram of the user interface 100 showing the search result 120 as including a preview link 210, according to some example embodiments. In response to a cursor input (e.g., a mouseover event or a mouse click event) that corresponds to the search result 120, the search result 120 now includes the preview link 210 titled "Show preview" and an aggregation link 220 titled "Add to My List." For example, a user may have moved a mouse cursor over the search result 120 and thereby caused the preview link 210 and the aggregation link 220 to appear in the search result 120. Operation of the preview link 210 causes the user interface 100 to show a preview of the item referenced by the search result 120, as discussed below with respect to FIG. 3. Operation of the aggregation link 220 selects that item to be added as a member of the list of items 140, as discussed below with respect to FIG. 4.

Figure 3:
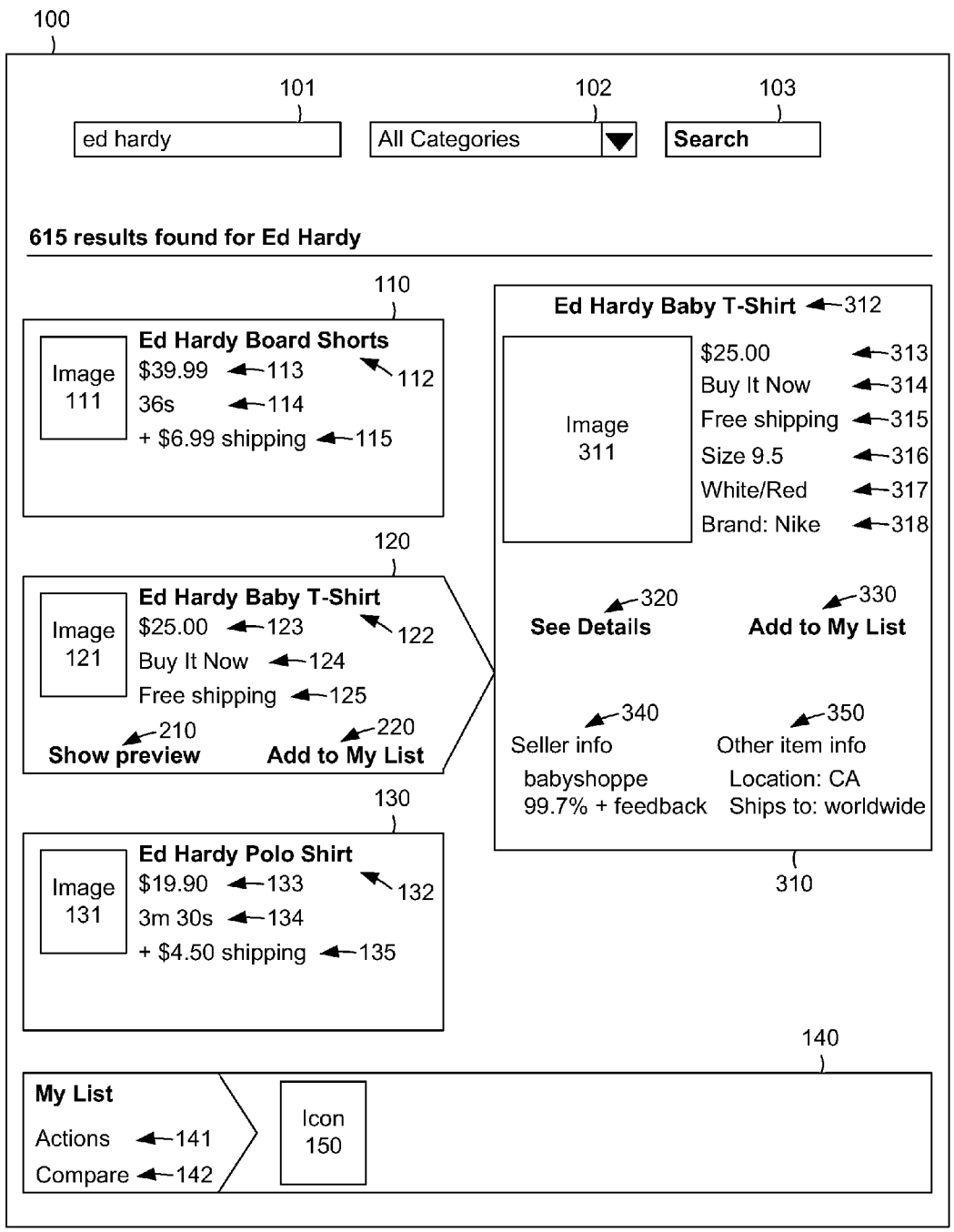
FIG. 3 is a diagram of the user interface showing search results and a preview of a selected item, according to some example embodiments.

FIG. 3 is a diagram of the user interface 100 showing a preview window 310 of the item referenced by the search result 120, according to some example embodiments. The preview window 310 is a graphical window that references and indicates the same item referenced by the search result 120. Presentation of the preview window 310 may be responsive to a cursor input (e.g., a mouse over event or a mouse click event) that corresponds to the search result 120 and that indicates the item referenced by the search result 120 is selected for an augmented presentation (e.g., in the preview window 310). For example, in response to operation of the preview link 210, the user interface 100 presents the preview window 310 with additional information about the item referenced by the search result 120. For example, a user may have clicked on the preview link 210 and thereby caused the preview window 310 to appear in the user interface 100.

The preview window 310 is presented in the user interface 100 as including an item image 311, an item name 312, descriptors 313-315, and descriptors 316-318. The descriptors 313-315 respectively present the same information as presented by the descriptors 123-125 in the search result 120, while the descriptors 316-318 present additional information. The preview window 310 is presented as corresponding to the search result 120. As shown in FIG. 3, the search result 120 is presented with a different shape that indicates correspondence with the preview window 310.

The preview window 310 is presented without obscuring any of the search results 110, 120, and 130. In other words, the user interface 100 presents the preview window 310 while maintaining an unobstructed presentation of any one or more of the search results 110, 120, and 130. This may have the effect of allowing a user of the user interface 100 to view the preview window 310 alongside, for example, the search result 110. This may facilitate a comparison of the item referenced by the search result 110 with the item referenced by the search result 120. This comparison may be based on one or more of the descriptors 113-115 and the descriptors 313-315. As noted above, the user interface 100 may present the search results 110, 120, 130 in a web page.

As shown, the item name 312 coincides with the item name 122 ("Ed Hardy Baby T-Shirt"), but this need not be the case as the item name 312 may be a variation of the item name 122 (e.g., with expanded acronyms or different formatting) or may contain additional information (e.g., product details). Although the descriptors 313-315 are shown as respectively matching the descriptors 123-125, any of the descriptors 313-315 may be a variation of its corresponding counterpart.

The preview window 310 includes a detail link 320 titled "See Details." Operation of the detail link 320 causes the user interface 100 to navigate away from the search results 110, 120, and 130 and display a new web page that focuses on the item referenced by the search result 120 and previewed in the preview window 310, namely, the "Ed Hardy Baby T-Shirt." This may hamper a user of the user interface 100 in maintaining attention on other search results (e.g., search results 110 and 130), which may be undesirable during certain portions of a decision-making process (e.g., gathering or comparison of information).

The preview window 310 includes an aggregation link 330 titled "Add to My List." Operation of the aggregation link 330 selects the item referenced by the preview window 310 to be added as a member of the list of items 140, as discussed below with respect to FIG. 4.

The preview window 310 also includes details 340 and 350, which each provide further information about the item referenced by the preview window 310. As shown, the detail 340 presents information about a seller of the item referenced by the preview window 310 ("babyshoppe") and a rating of the seller (99.7 percent positive). The detail 350 presents information regarding a location of the item referenced by the preview window 310 ("CA" for California) and its available destinations for shipping ("worldwide").

Figure 4:
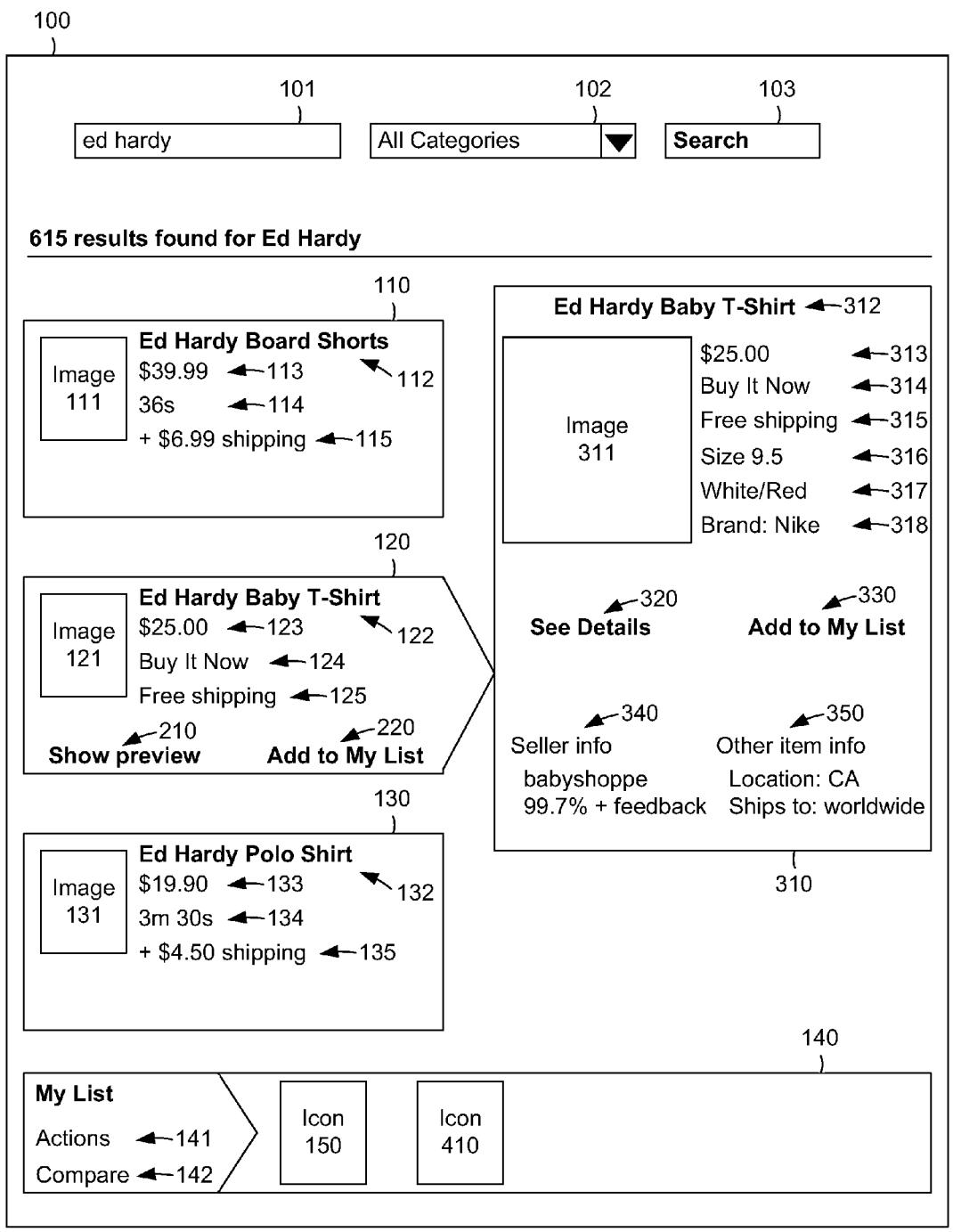
FIG. 4 is a diagram of the user interface showing search results, the preview of the particular search result, and a list of items, according to some example embodiments.

FIG. 4 is a diagram of the user interface 100 showing the preview window 310 and the list of items 140, according to some example embodiments. In response to operation of the aggregation link 330, the user interface 100 now presents the list of items 140 with an icon 410, in addition to the icon 150. For example, a user may have clicked on the aggregation link 330 and thereby caused the icon 410 to appear in the list of items 140. The icon 410 references the item referenced by the search result 120, which is the same item previewed in the preview window 310, and indicates membership of this item in the list of items 140. Accordingly, the icon 410 is an aggregation icon indicating that the item referenced by the search result 120 (and previewed in the preview window 310) is aggregated into the list of items 140. In some example embodiments, presence of the icon 410 within the list of items 140 indicates that the item is of interest to a user.

The icon 410 may be presented without obscuring any of the search results 110, 120, and 130. In other words, the user interface 100 may present the icon 410 while maintaining an unobstructed presentation of any of one or more search results (e.g., search results 110, 120, and 130). Moreover, the icon 410 may be presented without obscuring the preview window 310. Accordingly, the user interface 100 may present the icon 410 while maintaining an unobstructed presentation of the preview window 310.

Figure 5:
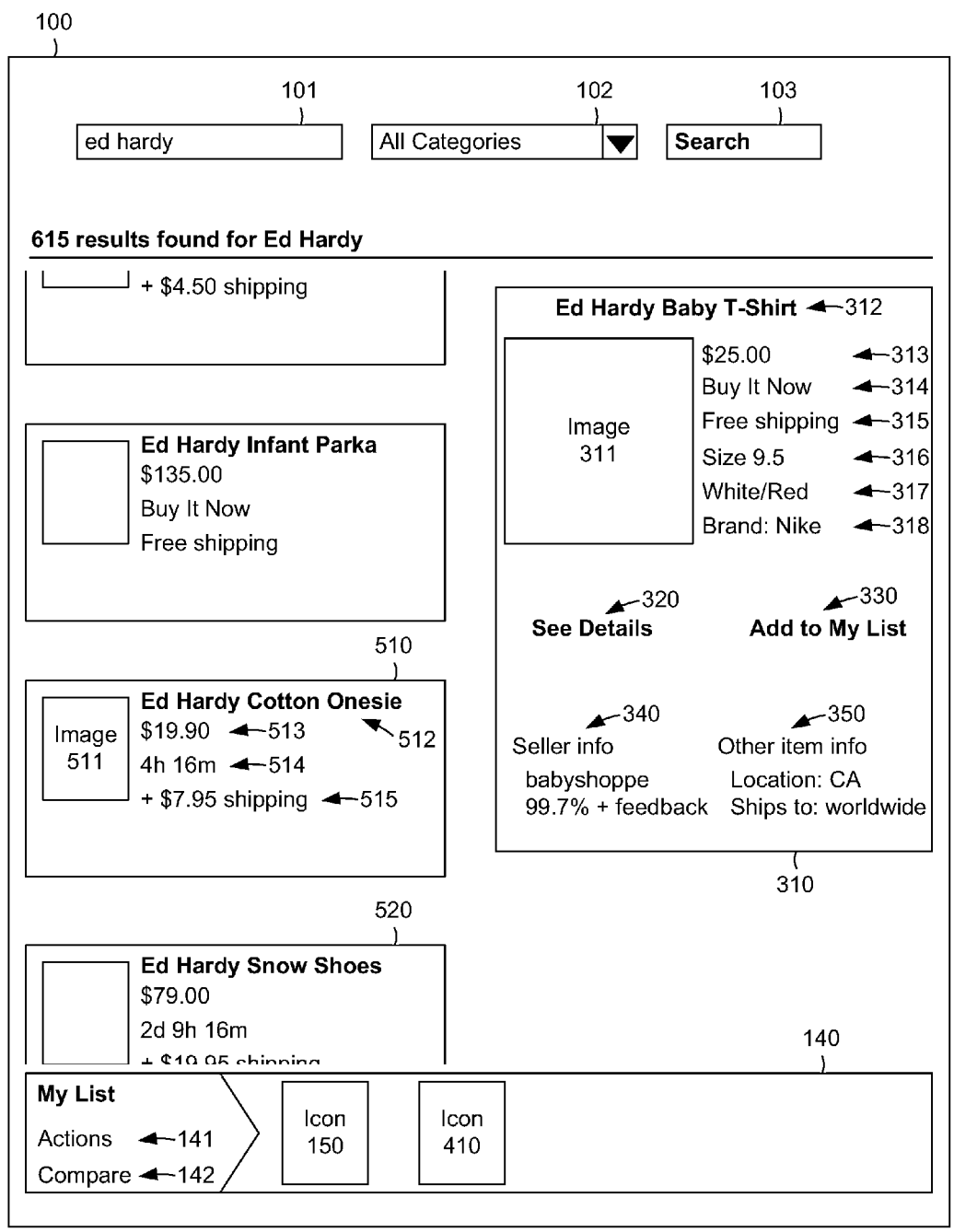
FIG. 5 is a diagram of the user interface showing further search results, the preview of the particular search result, and the list of items, according to some example embodiments.

FIG. 5 is a diagram of the user interface 100 showing search results 510 and 520, the preview window 310, and the list of items 140, according to some example embodiments. In response to a scrolling input (e.g., a page up command, a page down command, a scroll wheel command), the user interface 100 no longer presents the search results 110, 120, and 130. Instead, the user interface 100 presents the search results 510 and 520, which are presented alongside the preview window 310. For example, the search results 510 and 520 may be located below the search results 110, 120, and 130 on a single web page. As another example, the search results 510 and 520 may be located on a different web page from the search results 110, 120, and 130.

The search result 510 includes an item image 511, an item name 512, and descriptors 513-515. The item image 511 is a visual representation of an item represented by the search result 510, and this item may be available for purchase. The descriptor 513 has a value of "$19.90" for an attribute of "price." The descriptor 514 has a value of "4 h 16 m" for an attribute of "time remaining" The descriptor 515 has a value of "$7.95" for an attribute of "shipping fee." The search result 520 includes information analogous to information shown in the search result 510.

The preview window 310 is presented without obscuring any of the search results 510 and 520. In other words, the user interface 100 presents the preview window 310 while maintaining an unobstructed presentation of the search results 510 and 520. This may have the effect of allowing a user of the user interface 100 to view the preview window 310 alongside the search result 510. This may facilitate a comparison of the item referenced by the search result 510 with the item referenced by the search result 120. This comparison may be based on one or more of the descriptors 513-515 and the descriptors 313-315. As noted above, the user interface 100 may present the search results 510 and 520 in a web page.

Figure 6:
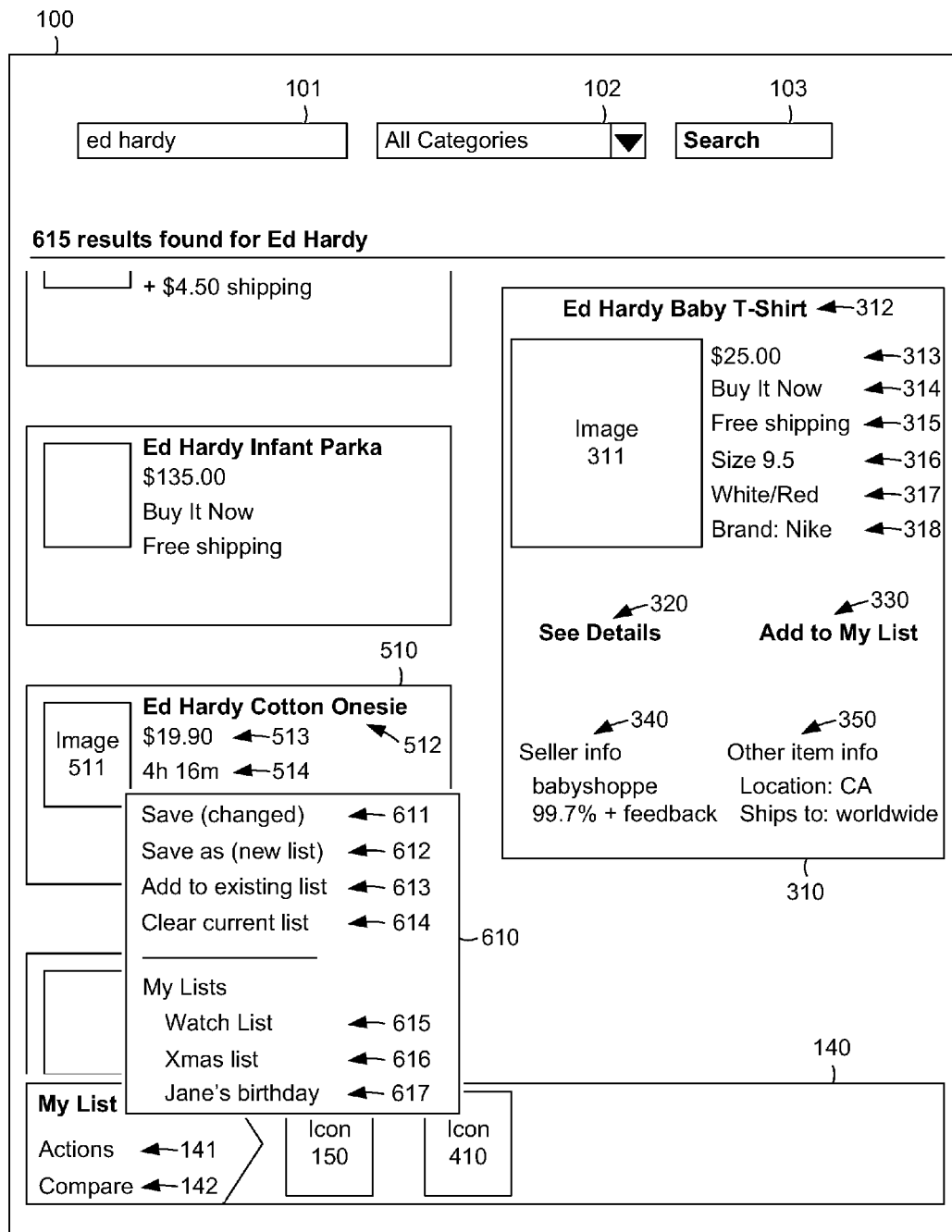
FIG. 6 is a diagram of the user interface showing the preview, the particular search result, the list of items, and a management interface, according to some example embodiments.

FIG. 6 is a diagram of the user interface 100 showing the list of items 140 and a management interface 610, according to some example embodiments. In response to a cursor input (e.g., a mouse click event) on the action link 141, the user interface 100 presents the management interface 610. For example, the management interface 610 may be presented as a pop-up window over all or part of one or more search results (e.g., search results 510 and 520) presented in the user interface 100.

The management interface 610 includes storage links 611-613, a purge link 614, and retrieval links 615-617. Operation of the storage link 611, titled "Save," initiates a request to save the list of items 140 as corresponding to a user (e.g., a user responsible for the cursor input on the action link 141) and using a pre-existing name for the list of items 140, if available. As shown, the storage link 611 may be further labeled with information (e.g., "(changed)") that indicates the list of items 140 has been modified, for example, from the latest version stored (e.g., saved in a database).

Operation of the storage link 612, titled "Save As," initiates a request to save the list of items 140 as corresponding to the user, using a new name for the list of items 140. As shown, the storage link 612 may be further labeled with information (e.g., "(new list)") that indicates the list 140 will be saved as a newly created list.

Operation of the storage link 613, titled "Add to existing list," initiates a request to save the list of items 140 as corresponding to the user by concatenating the list of items 140 with a pre-existing list previous stored as corresponding to the user. Examples of pre-existing lists are shown as respective titles of the retrieval links 615-617. In some example embodiments, operation of the storage link 613 causes the user interface 100 to present a selection interface operable to select a pre-existing list. In some example embodiments, the pre-existing list need not correspond to the user responsible for the cursor input on the action link 141. For example, one user operates the storage link 613 to add items to a list that corresponds to another user.

Operation of the purge link 614, titled "Clear current list," initiates a request to remove all items from the list of items 140. In some example embodiments, operation of the purge link 614 causes the user interface 100 to present the list of items 140 devoid of any icons (e.g., icons 150 and 410) to indicate that the list of items 140 has been cleared of all items.

Each of the retrieval links 615-617 is respectively titled with the name of a pre-existing list (e.g., stored in a database). Operation of each of the retrieval links 615-617 initiates a request to retrieve the corresponding list (e.g., from a database storing the corresponding list). For example, operation of the retrieval link 615, titled "Watch List," initiates a request to retrieve a list with that title. In some example embodiments, operation of the retrieval link 615 causes the user interface 100 to present in the list of items 140 only those items stored in the list titled "Watch List." Similarly, operation of the retrieval link 616, titled "Xmas List," may cause the user interface 100 to present only those items stored in the list titled "Xmas List" in the list of items 140. Likewise, operation of the retrieval link 617, titled "Jane's birthday," may cause the user interface 100 to present only those items stored in the list titled "Jane's birthday" in the list of items 140.

Figure 7:
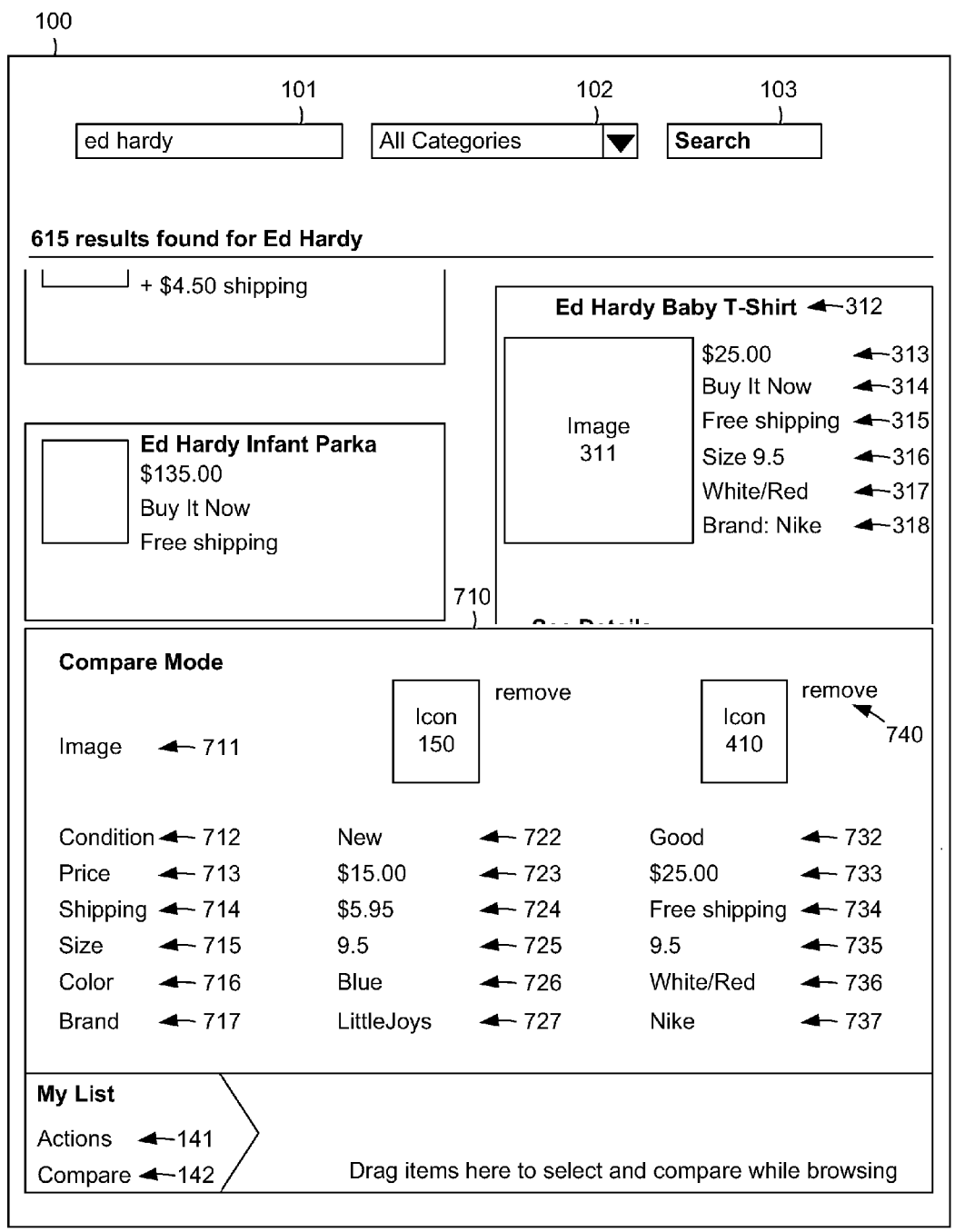
FIG. 7 is a diagram of the user interface showing a comparison window, according to some example embodiments.

FIG. 7 is a diagram of the user interface 100 showing a comparison window 710, according to some example embodiments. In response to a cursor input (e.g., a mouse click event) on the comparison link 142, the user interface 100 presents the comparison window 710. For example, the comparison window 710 may be present as a pop up window over all or part of one or more search results (e.g., search result 510) presented in the user interface 100.

The comparison window 710 presents a side-by-side comparison of two or more items included in the list of items 140. Shown in the comparison window 710 are attributes 712-717, values 722-727, and values 732-737.

As shown, the comparison window 710 presents information as a table, with the attributes 712-717 arranged in a column and functioning as row headers within the table. The icons 150 and 410 are identified as images by a label 711 ("Image") and function as column headers within the table.

The values 722-727 correspond to the attributes 712-717, respectively, as exhibited by the item referenced by the icon

150. Similarly, the values 732-737 correspond to the attributes 712-717, respectively, as exhibited by the item referenced by the icon 410. For example, the attribute 712 ("Condition") corresponds to the value 722 ("New") for the item referenced by the icon 150, while this same attribute 712 corresponds to the value 732 ("Good") for the item referenced by the icon 410. As another example, the attribute 716 ("Color") corresponds to the value 726 ("Blue") for the item referenced by the icon 150, while this attribute 716 corresponds to the value 736 ("White/Red") for the item referenced by the icon 410.

The comparison window 710 also includes a removal link 740, which is titled "remove" and shown as corresponding to the icon 410. Operation of the removal link 740 initiates a request to remove the item referenced by the corresponding icon 410 from the comparison window 710, from the list of items 140, or any combination thereof.

Figure 8:
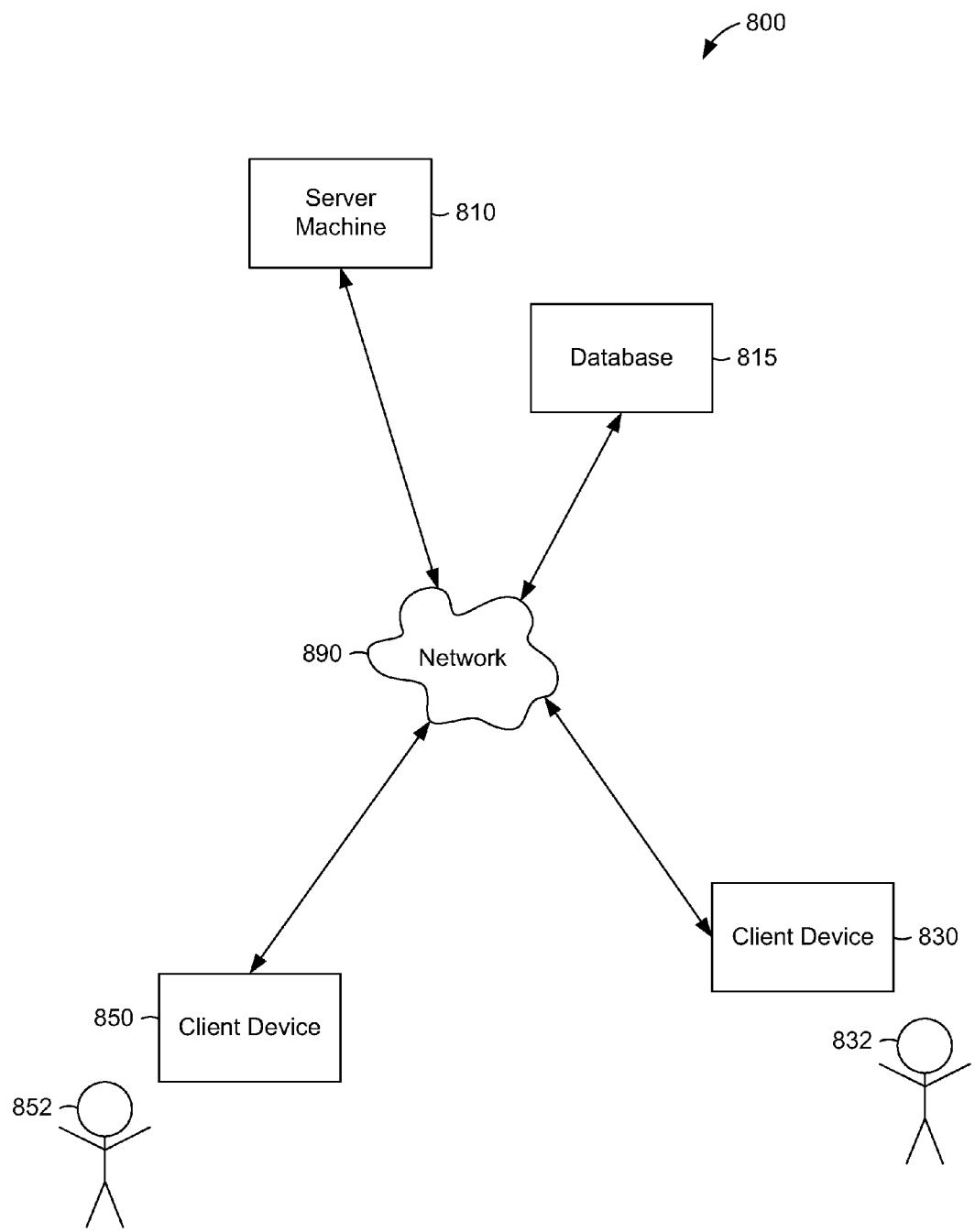
FIG. 8 is a network diagram illustrating a network environment suitable for presenting a list item preview with product aggregation, according to some example embodiments.

FIG. 8 is a network diagram illustrating a network environment 800 suitable for presenting a list item preview with product aggregation, according to some example embodiments. The network environment 800 includes a server machine 810, a database 815, and client devices 830 and 850, all communicatively coupled to each other via a network 890. The client devices 830 and 850 respectively correspond to users 832 and 852.

The server machine 810 provides network-based services to one or more client devices (e.g., client device 830) and may form all or part of a web server, a network-based system (e.g., commerce system, publication system, listing system, merchandising system, or transaction system), a database server, or any suitable combination thereof. For example, the server machine 810 may function as a search engine, a shopping server, an electronic storefront, an online auction website, a classified ad server, or any suitable combination thereof. The database 815 stores data pertinent to the server machine 810 (e.g., search results 110, 120, and 130 and list of items 140).

One or both of the users 832 and 852 may be a human user (e.g., a human being), a machine user (e.g., a software-configured device programmed to interact with a client device), or any suitable combination thereof. The user 832 is not part of the network environment 800, but is associated with the client device 830 and may be a user of the client device 830. For example, the client device 830 may be a deskside computer belonging to the user 832. Similarly, the user 852 is not part of the network environment 800, but is associated with the client device 850. As an example, the client device 850 may be a tablet computer belonging to the user 852.

Any of the machines, databases, or devices shown in FIG. 8 may be implemented in a general-purpose computer modified (e.g., configured or programmed) by software to be a special-purpose computer to perform the functions described herein for that machine. For example, a computer system able to implement any one or more of the methodologies described herein is discussed below with respect to FIG. 12. As used herein, a "database" is a data storage resource and may store data structured as a text file, a table, a spreadsheet, a relational database, a triple store, or any suitable combination thereof. Moreover, any two or more of the machines illustrated in FIG. 8 may be combined into a single machine, and the functions described herein for any single machine may be subdivided among multiple machines.

The network 890 may be any network that enables communication between machines (e.g., server machine 810 and client device 830). Accordingly, the network 890 may be a wired network, a wireless network, or any suitable combination thereof. The network 890 may include one or more portions that constitute a private network, a public network (e.g., the Internet), or any suitable combination thereof.

Figure 9:
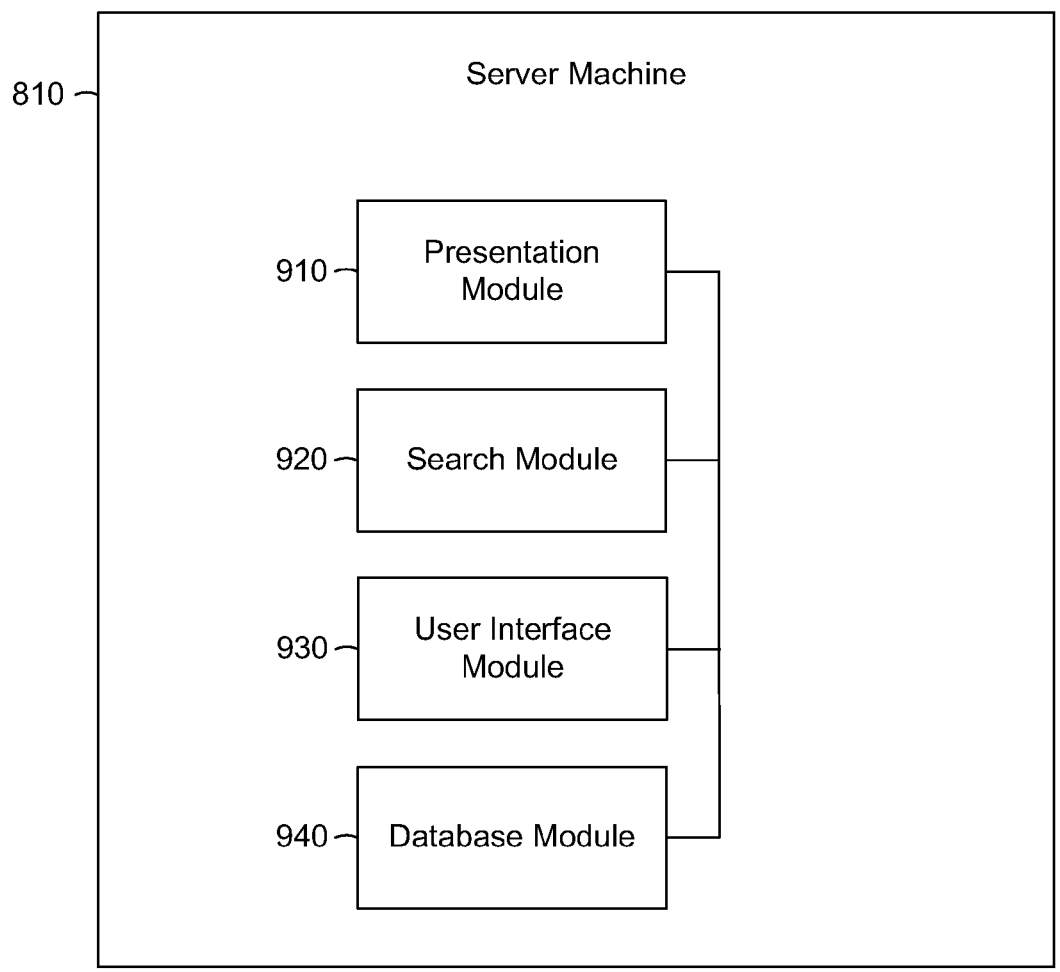
FIG. 9 is a block diagram illustrating components of a server machine suitable for presenting a list item preview with product aggregation, according to some example embodiments.

FIG. 9 is a block diagram illustrating components of the server machine 810, according to some example embodiments. The server machine 810 includes a presentation module 910, a search module 920, a user interface module 930, and a database module 940, all configured to communicate with each other (e.g., via a bus, a shared memory, or a switch). Any one or more of these modules may be implemented using hardware or a combination of hardware and software (e.g., as a module executed by a processor of a machine). Moreover, any two or more of these modules may be combined into a single module, and the functions described herein for a single module may be subdivided among multiple modules.

The presentation module 910 is configured to manage (e.g., generate, present, or modify) the user interface 100. As discussed above with respect to FIG. 1-7, the user interface 100 may include one or more of various elements at any particular time, including, for example, the search results 110, 120, and 130, the list of items 140, the preview window 310, the management interface 610, and the comparison window 710.

The search module 920 is configured to obtain search results (e.g., search results 110, 120, 130, 510, and 520). The search results may be obtained in any manner (e.g., generated by a search engine in response to a submitted query, retrieved from a database, or accessed in a memory). For example, the search module 920 may include a search engine. As another example, the search module 920 may be configured to access search results stored in the database 815 (e.g., stored as corresponding to the user 832). In some example embodiments, the search results may be obtained by execution of a query using information from the query field 101 and the pull-down menu 102. The search results may be communicated by the search module 920 to the presentation module 910 for inclusion in the user interface 100.

The user interface module 930 is configured to access (e.g., receive) information from a client device (e.g., client device 830). Information may be submitted by a user (e.g., a user 832) in interacting with the user interface 100. Examples of information accessed by the user interface module 930 include cursor inputs (e.g., mouseover events or mouse click events), scrolling inputs (e.g., page up, page down, or scroll wheel commands), operations of links (e.g., mouse click on the action link 141), submitted queries (e.g., operation of the search execution button 103), or other requests facilitated by the user interface 100. This information may be communicated by the user interface module 930 to any other module in a server machine 810.

The database module 940 is configured to store (e.g., save) one or more lists of items (e.g., list of items 140) in the database 815. For example, the database module 940 may receive the list from the presentation module 910. As another example, the database module 940 may access the list from a shared memory location that is used by the presentation module 910. A list may be stored with a name that identifies that list among multiple lists of items stored in the database 815. Moreover, one or more lists may be stored as corresponding to a user (e.g., user 832, user 852, or both).

Figure 10:
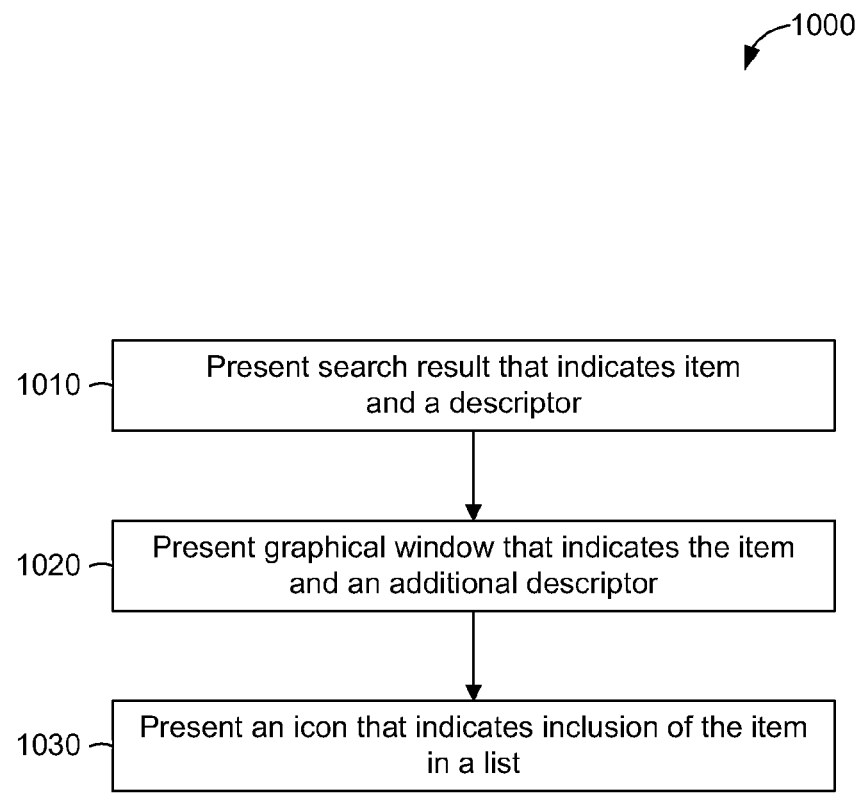
FIG. 10-11 are flowcharts illustrating a method of presenting a list item preview with product aggregation, according to some example embodiments.
Figure 11:
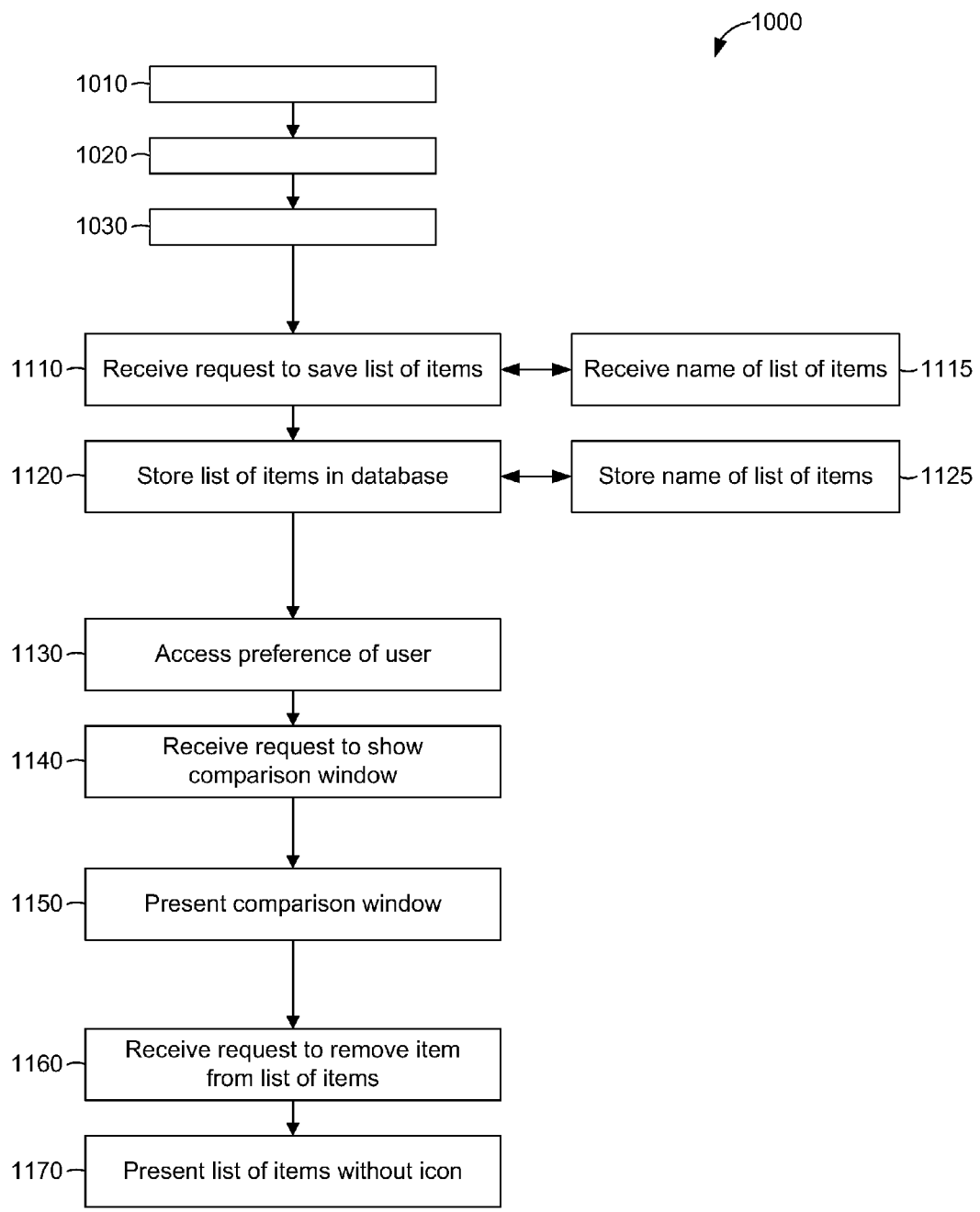

FIG. 10-11 are flowcharts illustrating a method 1000 of presenting a list item preview with product aggregation, according to some example embodiments. Operations in the method 1000 may be performed by the server machine 810, using modules described above with respect to FIG. 9.

As shown in FIG. 10, some example embodiments of the method 1000 include operations 1010, 1020, and 1030. In operation 1010, the presentation module 910 presents the search result 120, which references an item (e.g., an "Ed Hardy Baby T-Shirt"). For example, the presentation module 910 may present the search result 120 among multiple search results (e.g., search result 110 and 130). As discussed above, the search result 120 may be obtained by the search module 920 (e.g., in operation performed prior to the method 1000). The presenting of the search result 120 may occur using the user interface 100, which may be implemented as all or part of a web page. As noted above, the item referenced by the search result 120 may have multiple descriptors, including the descriptor 123 ("$25.00") and the descriptor 317 ("White/Red"), for example. The descriptor 123 (e.g., a first descriptor) is included in the search result 120, and the descriptor 317 (e.g., a second descriptor) is absent from the search result 120 (see FIG. 1) initially displayed in the user interface 100. In some example embodiments, operation 1010 involves the presentation module 910 presenting the user interface 100 as depicted in FIG. 1.

In operation 1020, the presentation module 910 presents the preview window 310. The presenting of the preview window 310 may occur using the user interface 100, which may be implemented as all or part of a web page. As noted above, the preview window 310 indicates the item and includes the descriptor 123 ("$25.00") and the descriptor 317 ("White/Red"). The descriptor 317 may remain absent from the search result 120 (see FIG. 3). The presentation module 910 may present the preview window 310 in response to a cursor input (e.g., a mouse over event or a mouse click event) that corresponds to the search result 120 and indicates that the item is selected for an augmented presentation (e.g., a preview) in the preview window 310. For example, the cursor input may be a mouse click on the preview link 210. In certain example embodiments, operation 1020 involves the presentation module 910 presenting the user interface 100 as depicted in FIG. 3.

In operation 1030, the presentation module 910 presents the icon 410, which indicates that the item referenced by the search result 120 is included in the list of items 140. The presenting of the icon 410 may occur using the user interface 100, which may be implemented as all or part of a web page. For example, presentation of the icon 410 within the list of items 140 may serve to indicate inclusion of the item in the list of items 140. The presentation module 910 may present the icon 410 in response to a cursor input (e.g., a further cursor input) that corresponds to the preview window 310 and indicates that the item is selected as a member of the list of items 140. Since the presentation module 910 may be implemented wholly or partly in hardware (e.g., a processor of a machine), operation 1030 may be performed by a module implemented in hardware. In various example embodiments, operation 1030 involves the presentation module 910 presenting the user interface 100 as depicted in FIG. 4.

As shown in FIG. 11, some example embodiments of the method 1000 include operations 1110-1170. In operation 1110, the user interface module 930 receives a request to save the list of items 140 as corresponding to the user 832. The request may be received from the client device 830, which is associated with the user 832. The request may include a cursor input (e.g., a mouse over event or a mouse click event) that indicates operation of a storage link (e.g., storage link 612) within the management interface 610.

Operation 1110 may include operation 1115. In operation 1115, the user interface module 930 receives a name for the list of items 140. The name identifies the list of items 140 among multiple lists of items that correspond to the user 832. The name may be received from the client device 830. For example, the user interface module 930 may receive "Bob's birthday" as the name for the list of items 140.

In operation 1120, the database module 940 stores the list of items 140 in the database 815 as corresponding to the user 832. When the list of items 140 is stored, the list of items 140 includes the item selected for augmented presentation in the preview window 310, which is the same item referenced by the search result 120. The storing of the list of items 140 may be responsive to the request received in operation 1110.

Operation 1120 may include operation 1125. In operation 1125, the database module 940 stores the name that was received in operation 1115 for the list of items 140. In various example embodiments, operations 1120 and 1125 may be combined into a single operation that stores the list of items 140 using the name received in operation 1115.

In operation 1130, the database module 940 accesses a preference of the user 832. According to some example embodiments, the server machine 810 implement a policy of accessing the preference of the user 832 prior to presenting information to the user 832 (e.g., as in operation 1150, described below). For example, the database 815 may store a preference profile that corresponds to the user 832, and the database module 940 of the server machine 810 may access the preference profile and read a preference of the user 832. The preference may indicate an attribute that is common to multiple items in the list of items 140. For example, multiple items in the list of items 140 may have a "color" as an attribute, with one item exhibiting "red" as its color and another item exhibiting "blue" as its color. The preference of the user 832 may indicate that a particular attribute (e.g., "color") is to be used in a comparison of items.

In operation 1140, the user interface module 930 receives a request to compare items that are included in the list of items 140 (e.g., the item referenced by the icon 410 and a further item referenced by the icon 150). For example, the request may include a cursor input (e.g., a mouse over event or a mouse click event) that indicates operation of the comparison link 142 within the management interface 610. The request may be received from the client device 830, which is associated with the user 832. In some example embodiments, operations 1130 and 1140 may be combined into a single operation that receives the preference of the user 832 and the request to compare items.

In operation 1150, the presentation module 910 presents the comparison window 710. The presenting of the comparison window 710 may occur using the user interface 100, which may be implemented as all or part of a web page. As noted above, the comparison window 710 indicates multiple items (e.g., the item referenced by the icon 410 and a further item referenced by the icon 150). The presentation module 910 may present the comparison window 710 as including respective descriptors for the multiple items, and generation of the comparison window 710 may be based on the preference of the user 832 accessed in operation 1130. In some example embodiments, the presentation module 910 generates the comparison window 710 as being inclusive of these respective descriptors. The respective descriptors may be respective values of the same attribute. For example, a descriptor for one item may be a value of "blue" for the attribute of "color," while another descriptor for another item may be a value of "red" for the attribute of "color." In certain example embodiments, operation 1150 involves the presentation module 910 presenting the user interface 100 as depicted in FIG. 7.

In operation 1160, the user interface module 930 receives a request to remove the item referenced by the icon 410 from the comparison window 710, from the list of items 140, or any combination thereof. For example, the request may include a cursor input (e.g., a mouse over event or a mouse click event) that indicates operation of the removal link 740 within the comparison window 710. In some example embodiments, the cursor input indicates a request to deselect the item from membership in the list of items 140. The request may be received from the client device 830, which is associated with the user 832.

In operation 1170, the presentation module 910 presents the list of items 140 without the icon 410. This operation may be performed in response to the request received in operation 1160. In some example embodiments, absence of the icon 410 from the list of items 140 indicates that the item is not of interest to the user 832, that the item is no longer included in the list of items 140, or both.

According to various example embodiments, one or more of the methodologies described herein may facilitate presenting an item preview with aggregation to a list. In particular, one or more of the methodologies described herein may constitute all or part of a business method (e.g., a business method implemented by a machine) that enables one or more users of a network-based system to view a preview of information beyond that which is shown in a search result, perform side-by-side comparisons of information shown in multiple search results, and perform further comparisons of information not shown in the multiple search results. Accordingly, one or more of the methodologies described herein may have the effect of facilitating decision-making by a user, increasing sales of a product, increasing user attention on a product, or any suitable combination thereof.

As a result, one or more of the methodologies described herein may obviate a need for certain efforts or resources that otherwise would be involved in research, decision-making, online shopping, or both. Efforts expended by a user in identifying a product for purchase may be reduced by one or more of the methodologies described herein. Computing resources used by one or more machines, databases, or devices (e.g., within the network environment 800) may similarly be reduced. Examples of such computing resources include processor cycles, network traffic, memory usage, data storage capacity, power consumption, and cooling capacity.

Figure 12:
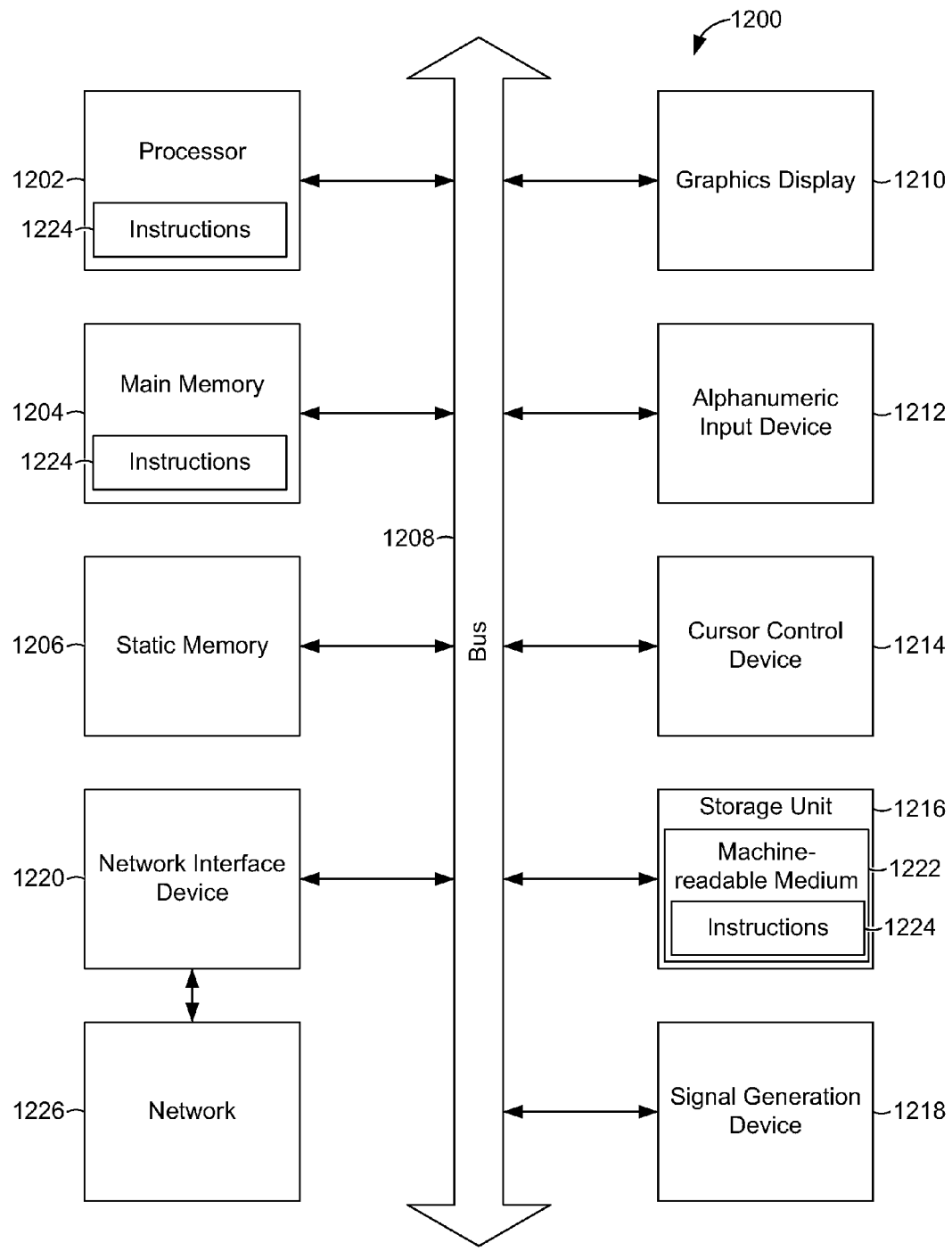
FIG. 12 is a block diagram illustrating components of a machine, according to some example embodiments, able to read instructions from a machine-readable medium and perform any one or more of the methodologies discussed herein.

FIG. 12 illustrates components of a machine 1200, according to some example embodiments, that is able to read instructions from a machine-readable medium (e.g., a machine-readable storage medium) and perform any one or more of the methodologies discussed herein. Specifically, FIG. 12 shows a diagrammatic representation of the machine 1200 in the example form of a computer system and within which instructions 1224 (e.g., software) for causing the machine 1200 to perform any one or more of the methodologies discussed herein may be executed. In alternative embodiments, the machine 1200 operates as a standalone device or may be connected (e.g., networked) to other machines. In a networked deployment, the machine 1200 may operate in the capacity of a server machine or a client machine in a server-client network environment, or as a peer machine in a peer-to-peer (or distributed) network environment. The machine 1200 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 1224 (sequentially or otherwise) that specify actions to be taken by that machine. Further, while only a single machine is illustrated, the term "machine" shall also be taken to include a collection of machines that individually or jointly execute the instructions 1224 to perform any one or more of the methodologies discussed herein.

The machine 1200 includes a processor 1202 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 1204, and a static memory 1206, which are configured to communicate with each other via a bus 1208. The machine 1200 may further include a graphics display 1210 (e.g., a plasma display panel (PDP), a liquid crystal display (LCD), a projector, or a cathode ray tube (CRT)). The machine 1200 may also include an alphanumeric input device 1212 (e.g., a keyboard), a cursor control device 1214 (e.g., a mouse, a touchpad, a trackball, a joystick, a motion sensor, or other pointing instrument), a storage unit 1216, a signal generation device 1218 (e.g., a speaker), and a network interface device 1220.

The storage unit 1216 includes a machine-readable medium 1222 on which is stored the instructions 1224 (e.g., software) embodying any one or more of the methodologies or functions described herein. The instructions 1224 may also reside, completely or at least partially, within the main memory 1204, within the processor 1202 (e.g., within the processor's cache memory), or both, during execution thereof by the machine 1200. Accordingly, the main memory 1204 and the processor 1202 may be considered as machine-readable media. The instructions 1224 may be transmitted or received over a network 1226 (e.g., network 890) via the network interface device 1220.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 1222 is shown in an example embodiment to be a single medium, the term "machine-readable medium" should be taken to include a single medium or multiple media (e.g., a centralized or distributed database, or associated caches and servers) able to store instructions (e.g., instructions 1224). The term "machine-readable medium" shall also be taken to include any medium that is capable of storing instructions (e.g., software) for execution by the machine, such that the instructions, when executed by one or more processors of the machine (e.g., processor 1202), cause the machine to perform any one or more of the methodologies described herein. The term "machine-readable medium" shall accordingly be taken to include, but not be limited to, a data repository in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured by software to become a special-purpose processor, the general-purpose processor may be configured as respectively different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
within a web page, presenting a search result that indicates an item,
the item having a first descriptor and a second descriptor,
the first descriptor being included in the presented search result,
the second descriptor being absent from the presented search result;
presenting a graphical window that indicates the item and that includes the first and second descriptors,
the second descriptor remaining absent from the presented search result, the graphical window presenting the first and second descriptors within the web page while maintaining an unobstructed presentation of the search result presented in the web page,
the presenting of the graphical window being responsive to a cursor input that corresponds to the search result and that indicates the item is selected for an augmented presentation in the graphical window;
presenting a further graphical window that depicts an icon that indicates inclusion of the item in a list of items,
the presenting of the icon being responsive to a further cursor input that corresponds to the graphical window and that indicates the item is selected as a member of the list of items,
the presenting of the icon being performed by a module implemented by a processor of a machine;
presenting a comparison window that indicates both the item indicated in the search result and a further item in response to a request to compare items from the list of items including the item indicated in the search result and the further item, the comparison window including the icon of the item positioned next to a removal link selectable to initiate a request to remove the item from the comparison window, the comparison window being a single pop-up window presented over a portion of the search result that indicates the item and above the further graphical window; and
removing the item referenced by the corresponding icon of the item from the comparison window and removing the icon of the item from the further graphical window in response to the request initiated by the removal link included in the comparison window.

2. The method of claim 1, wherein:
the presenting of the search result occurs within the web page; and
the presenting of the icon occurs within the web page while maintaining an unobstructed presentation of the presented search result.

3. The method of claim 1, wherein:
the presenting of the icon occurs within the web page while maintaining an unobstructed presentation of the presented graphical window.

4. The method of claim 1, wherein:
the presenting of the search result includes presenting the search result within a plurality of search results; and
the presenting of the graphical window occurs while maintaining an unobstructed presentation of the presented plurality of search results.

5. The method of claim 1, wherein:
the presenting of the search result includes presenting the search result within a plurality of search results; and
the presenting of the icon occurs while maintaining an unobstructed presentation of the presented plurality of search results.

6. The method of claim 1, wherein:
the presenting of the icon occurs within the further graphical window that displays a plurality of icons representative of at least a portion of the list of items.

7. The method of claim 6, wherein:
the presenting of the search result occurs within a presentation of a plurality of search results that includes the search result; and
the further graphical window obscures at least one of the plurality of search results.

8. The method of claim 1 further comprising:
storing the list of items as being inclusive of the item selected for the augmented presentation in the graphical window.

9. The method of claim 8, wherein:
the storing of the list of items is responsive to a request to save the list of items as corresponding to a user,
the request being received from a device of the user.

10. The method of claim 8, wherein:
the storing of the list of items includes storing a name of the list of items,
the name of the list of items identifying the list of items among a plurality of lists of items.

11. The method of claim 10 further comprising:
receiving the name of the list of items from the device of the user, the plurality of lists of items corresponding to the user.

12. The method of claim 1, wherein
the comparison window that indicates the item and that indicates the further item includes the second descriptor of the item and a further descriptor of the further item.

13. The method of claim 1, wherein:
the comparison window indicates that the item and the further item are selected for comparison; and
the presenting of the comparison window is responsive to a request to compare the item with the further item, the request being received from a device of a user.

14. The method of claim 12, wherein:
the second descriptor of the item is a value of an attribute as exhibited by the item;
the further descriptor of the further item is a further value of the attribute as exhibited by the further item; and
the comparison window includes the second descriptor and the further descriptor based on the attribute.

15. The method of claim 14 further comprising:
accessing a preference of a user,
the preference indicating the attribute; and wherein
the comparison window includes the second descriptor and the further descriptor based on the preference being indicative of the attribute.

16. The method of claim 1, wherein:
the search result indicates the item as being available for purchase; and
the icon indicates that the item is of interest to a user.

17. The method of claim 1 further comprising:
receiving a request to deselect the item from membership in the list of items; and
presenting the list of items without the icon subsequent to the presenting of the icon,
an absence of the icon from the list being indicative of the item being no longer included in the list of items,
the presenting of the list of items without the icon being in response to the request to deselect the item from membership in the list of items.

18. A system comprising:
one or more processors and executable instructions accessible on a non-transitory computer-readable medium that, when executed, configure the one or more processors to at least:
within a web page, present a search result that indicates an item,
the item having a first descriptor and a second descriptor,
the first descriptor being included in the presented search result,
the second descriptor being absent from the presented search result;
present a graphical window that indicates the item and that includes the first and second descriptors, the second descriptor remaining absent from the presented search result,
the graphical window presenting the first and second descriptors within the web page while maintaining an unobstructed presentation of the search result presented in the web page,
the presenting of the graphical window being responsive to a cursor input that corresponds to the search result and that indicates the item is selected for a presentation in the graphical window;
present a further graphical window that depicts an icon that indicates inclusion of the item in a list of items,
the presenting of the icon being responsive to a further cursor input that corresponds to the graphical window and that indicates the item is selected as a member of the list of items;
present a comparison window that indicates both the item indicated in the search result and a further item in response to a request to compare items from the list of items including the item indicated in the search result and the further item, the comparison window including the icon of the item positioned next to a removal link selectable to initiate a request to remove the item from the comparison window, the comparison window being a single pop-up window presented over a portion of the search result that indicates the item and above the further graphical window;
remove the item referenced by the corresponding icon of the item from the comparison window and remove the icon of the item from the further graphical window in response to the request initiated by the removal link included in the comparison window; and
generate the search result in response to a query received from a device of the user.

19. A non-transitory machine-readable storage medium comprising instructions that, when executed by one or more processors of a machine, cause the machine to perform operations comprising:
within a web page, presenting a search result that indicates an item,
the item having a first descriptor and a second descriptor,
the first descriptor being included in the presented search result,
the second descriptor being absent from the presented search result;
presenting a graphical window that indicates the item and that includes the first and second descriptors,
the second descriptor remaining absent from the presented search result,
the graphical window presenting the first and second descriptors within the web page while maintaining an unobstructed presentation of the search result presented in the web page,
the presenting of the graphical window being responsive to a cursor input that corresponds to the search result and that indicates the item is selected for a presentation in the graphical window;
presenting a further graphical window that depicts an icon that indicates inclusion of the item in a list of items,
the presenting of the icon being responsive to a further cursor input that corresponds to the graphical window and that indicates the item is selected as a member of the list of hems;
presenting a comparison window that indicates both the item indicated in the search result and a further item in response to a request to compare items from the list of items including the item indicated in the search result and the further item, the comparison window including the icon of the item positioned next to a removal link selectable to initiate a request to remove the item from the comparison window, the comparison window being a single pop-up window presented over a portion of the search result that indicates the item and above the further graphical window; and
removing the item referenced by the corresponding icon of the item from the comparison window and removing the icon of the item from the further graphical window in response to the request initiated by the removal link included in the comparison window.

* * * * *